Figure 5:
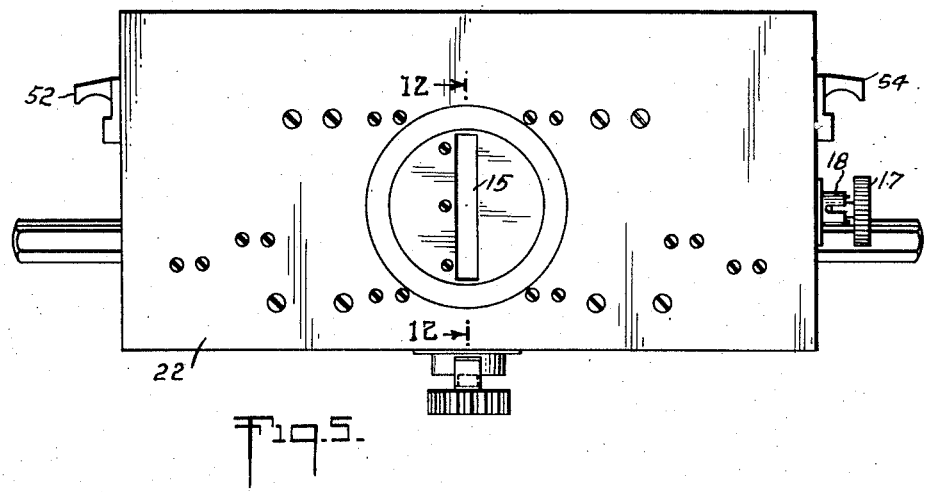

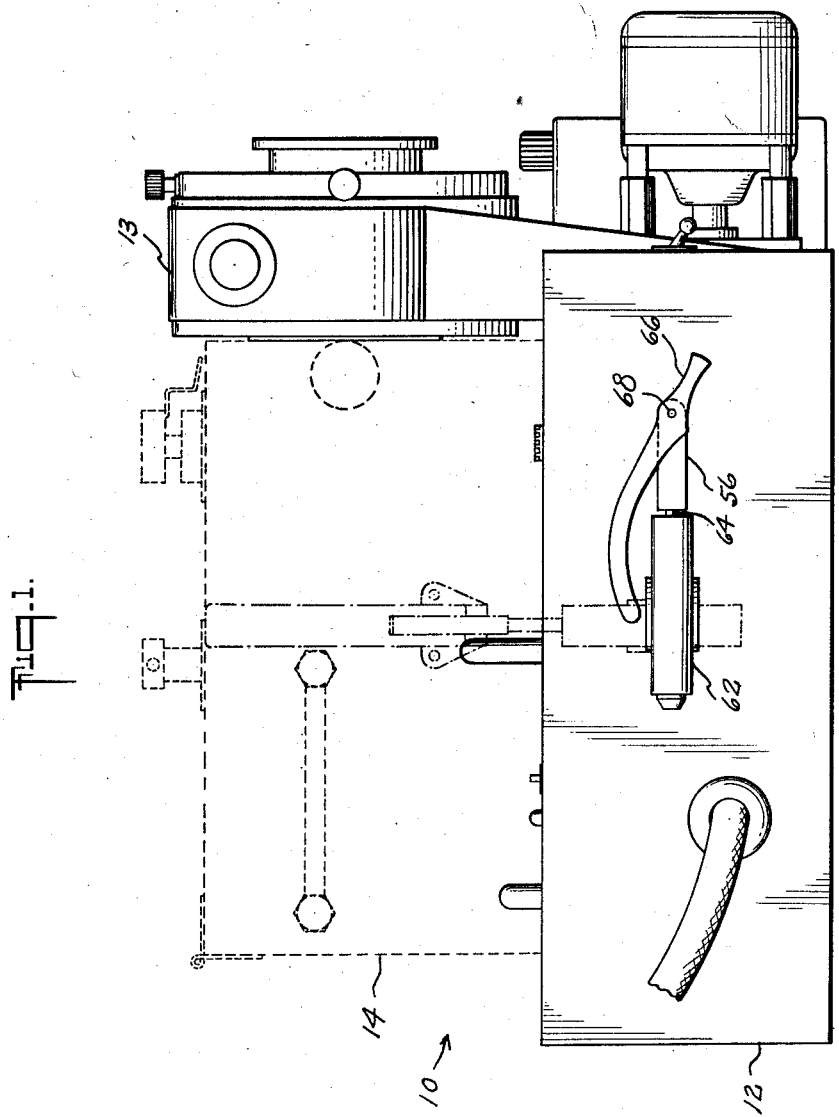

March 15, 1960  E. E. HELVEY ET AL  2,928,312
SLOW SPEED CAMERA
Filed March 8, 1954  9 Sheets-Sheet 2
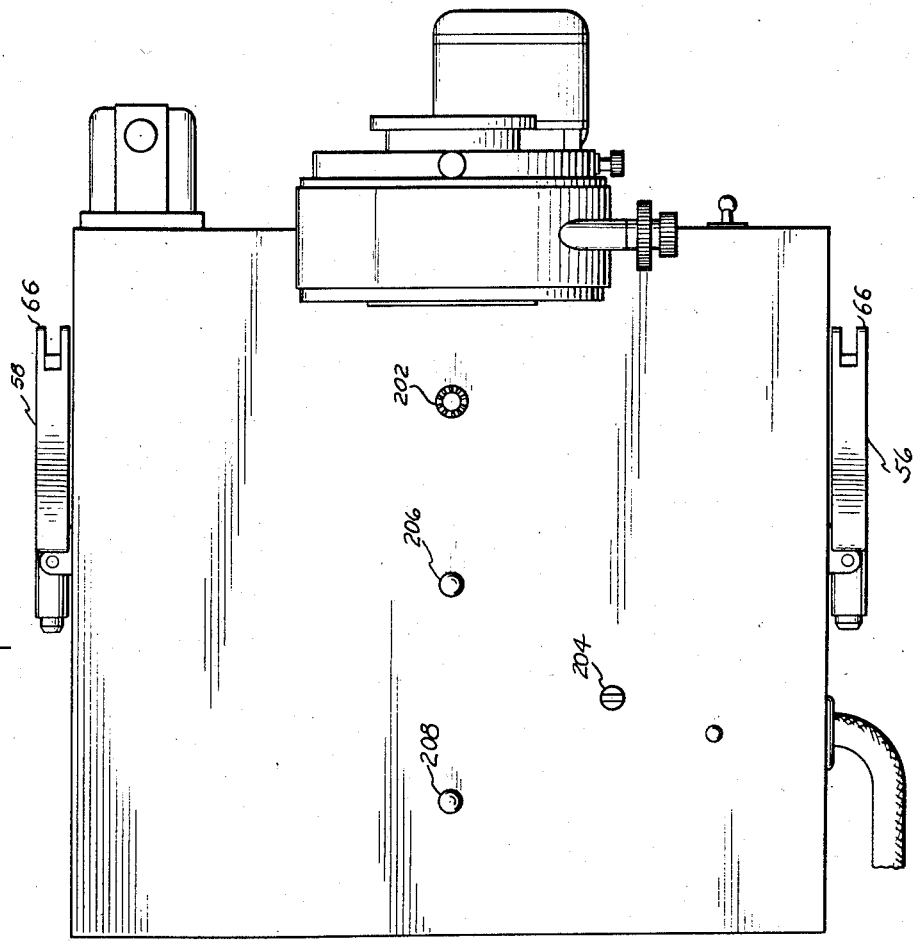
INVENTORS
EDWARD E. HELVEY
GOTTFRIED H. HOHMAN
BY
Lee J. Huntzberger
ATTORNEYS March 15, 1960     E. E. HELVEY ET AL     2,928,312
SLOW SPEED CAMERA
Filed March 8, 1954                                         9 Sheets-Sheet 3
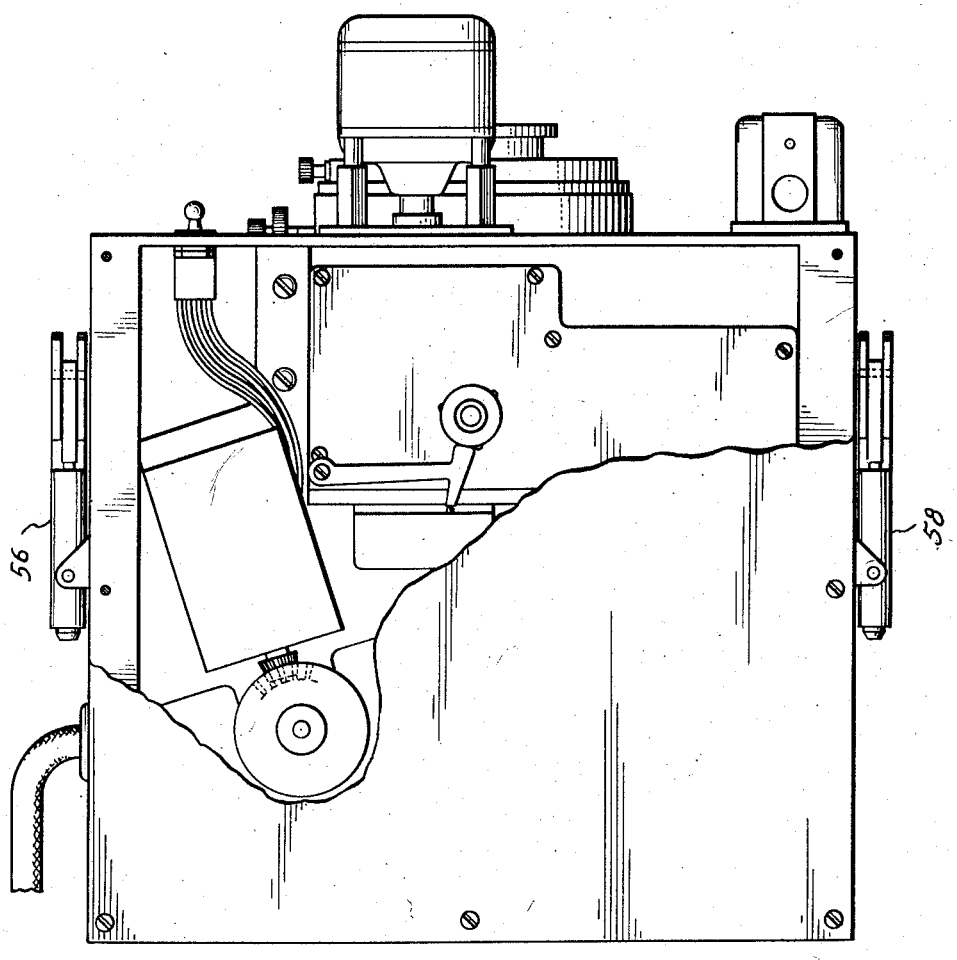
INVENTORS
EDWARD E. HELVEY
GOTTFRIED H. HOHMAN
BY
*Lee J. Huntberger*
ATTORNEYS March 15, 1960   E. E. HELVEY ET AL   2,928,312
SLOW SPEED CAMERA Filed March 8, 1954   9 Sheets-Sheet 4

INVENTORS
EDWARD E. HELVEY
GOTTFRIED H. HOHMAN
BY
Lee J Huntzberger
ATTORNEYS

March 15, 1960

E. E. HELVEY ET AL 2,928,312

SLOW SPEED CAMERA

Filed March 8, 1954

9 Sheets-Sheet 5

INVENTOR
EDWARD E. HELVEY
GOTTFRIED H. HOHMAN
BY
Lee J. Huntzberger
ATTORNEYS

March 15, 1960 E. E. HELVEY ET AL 2,928,312
SLOW SPEED CAMERA
Filed March 8, 1954 9 Sheets-Sheet 6
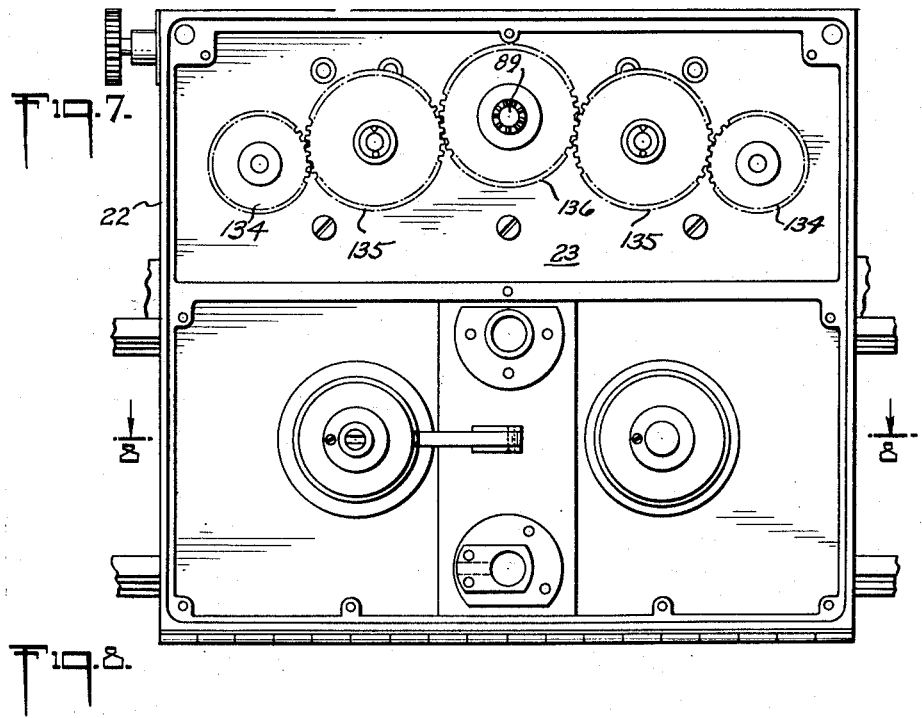
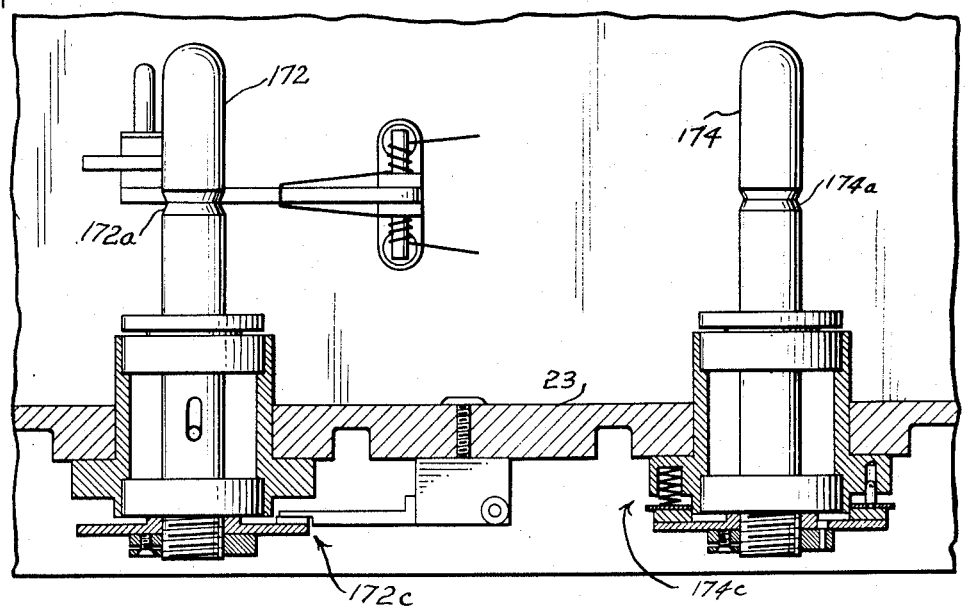
INVENTORS
EDWARD E. HELVEY
GOTTFRIED H. HOHMAN
BY
ATTORNEYS

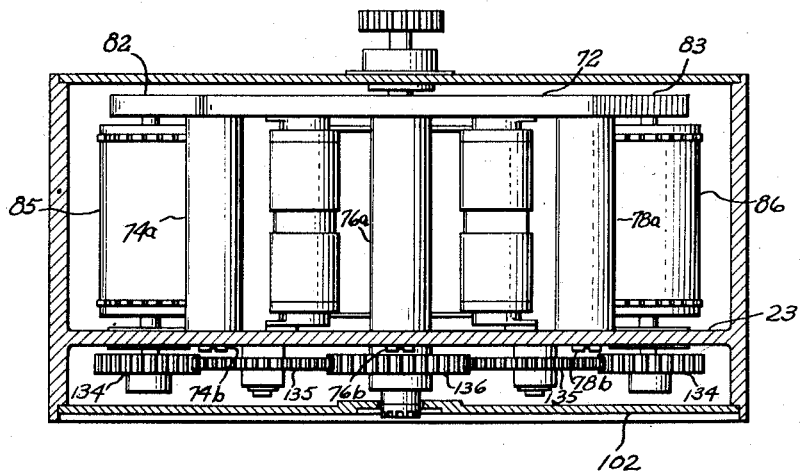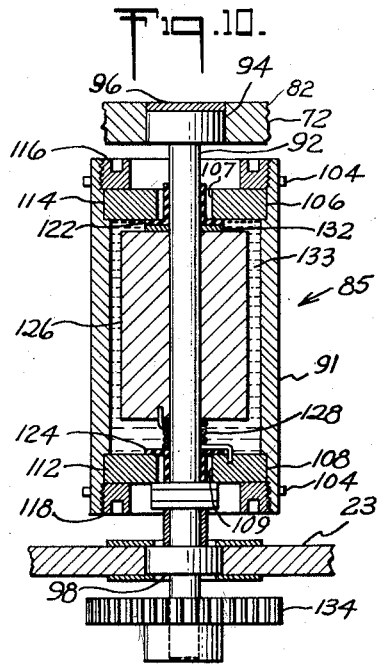

March 15, 1960    E. E. HELVEY ET AL    2,928,312
SLOW SPEED CAMERA
Filed March 8, 1954    9 Sheets-Sheet 8
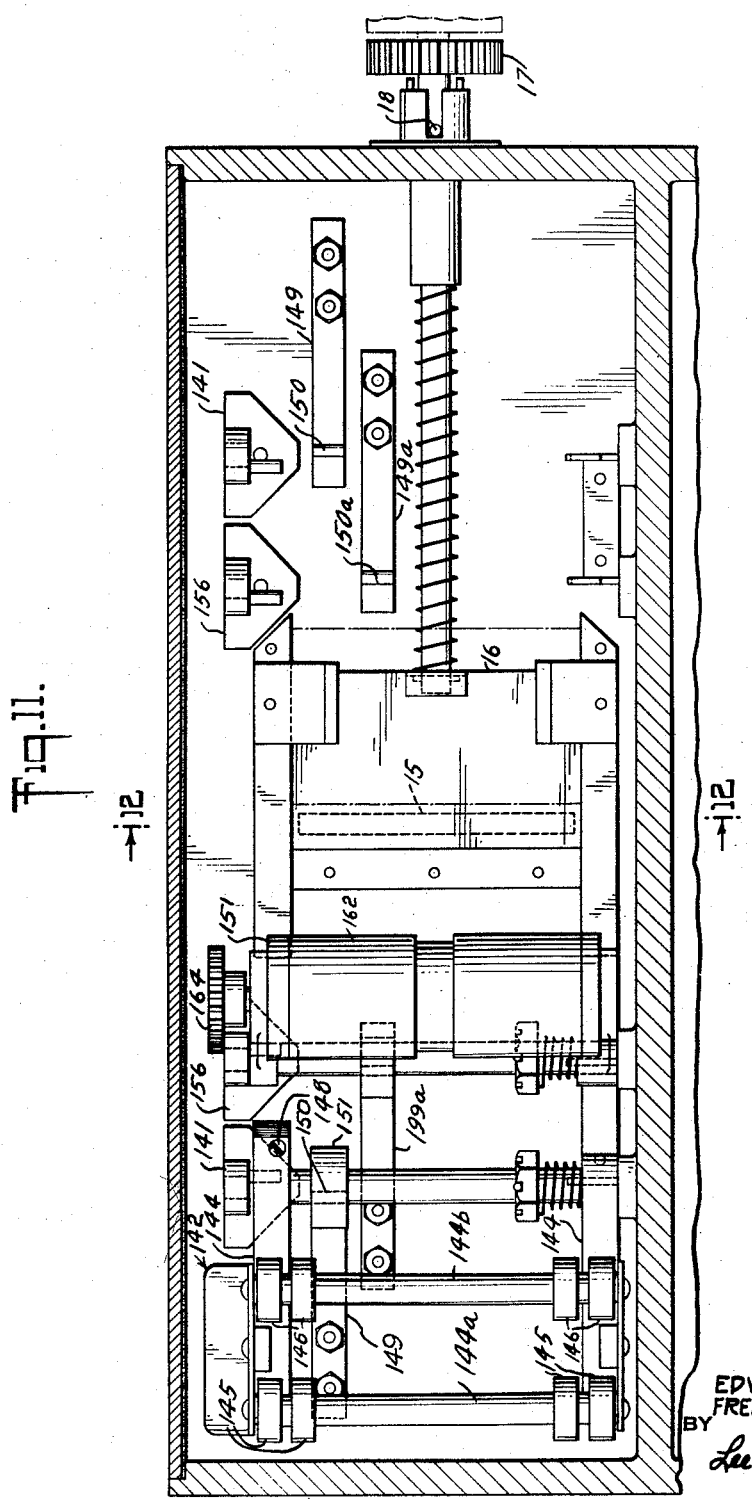
INVENTORS
EDWARD E. HELVEY
FREDERICK H. HOHMAN
BY
Lee J. Huntsberger
ATTORNEYS March 15, 1960 E. E. HELVEY ET AL 2,928,312
SLOW SPEED CAMERA
Filed March 8, 1954 9 Sheets-Sheet 9

INVENTORS.
EDWARD E. HELVEY
GOTTFRIED H. HOHMAN
BY
*Lee J. Huntberger*
ATTORNEYS

United States Patent Office 2,928,312
Patented Mar. 15, 1960

2,928,312

SLOW SPEED CAMERA

Edward E. Helvey, Clifton, N.J., and Gottfried H. Hohmann, Albertson, N.Y., assignors to the United States of America as represented by the Secretary of the Navy Application March 8, 1954, Serial No. 414,921

7 Claims. (Cl. 88—16)

This invention relates to a camera and more particularly it relates to a slow-speed camera which may be used for cathode ray tube trace recording.

This invention is particularly adapted for use in a facsimile recording system including a cathode ray tube. It includes an arrangement for eliminating density variation in film recorded facsimile messages. It was found that the principal cause of density variation in recorded copy was variation of the speed of the film in the camera. When the speed of the film fluctuated, density variations result from crowding and separation of scanned lines. It has been found that density variation may have a random and a repetitive character. In general cameras are provided with sprockets for film drive. Sprockets provide for positive contact with the film but at the same time introduce film speed irregularities due to load changes, sprocket hole dimensional variations in film and dimensional variations in sprocket teeth. This invention overcomes these difficulties and also provides a completely novel camera arrangement.

The camera includes a separable magazine and a motor and gear box for driving film through the camera. The gear box includes gears to provide four (1:1) (1:10) (1:100) (1:1000) ratios of speed reduction. The motor, not shown, is a two-phase synchronous motor adapted to be powered by the two-phase power supply disclosed in copending application Serial No. 414,920, filed March 8, 1954 by Nathaniel L. Cohen et al., for Two-Phase Power Supply and assigned to the assignee of this invention. In order to provide exceptionally smooth film travel not only are the gears fabricated with a high degree of precision but they are further used in combination with a mechanical filter to average out all fluctuations in the film drive. The camera is designed for daylight loading through the use of the separable magazine. The magazine includes a film supply reel, a film take-up real, a film drive sprocket, a film take-up sprocket, and a film drive drum. The motor and gear housing support the lens and its associated focus means. In addition, the motor and gear housing contain a separate take-up motor for the take-up reel. A focus magazine may be provided which is essentially a dummy of the film magazine being provided with a microscope for optical focusing of the cathode ray tube and camera, and further provided with a photo-multiplier arrangement for electro-optical focussing more specifically described in copending application Serial No. 414,916 filed March 8, 1954 by Edgar W. Van Winkle for Light Intensity Metering Device and assigned to the assignee of this invention.

An object of this invention is to provide a camera.

A further object is to provide a camera that is adapted for cathode ray tube trace recording.

A further object is to provide a camera adapted to drive film with a continuous uniform motion and to continuously focus the spot of a cathode ray tube in the focal plane thereof for continuously recording sequential traces formed on the cathode ray tube screen.

A further object is to provide a camera adapted to drive film with a continuous uniform motion.

A further object is to provide a mechanical filter for a camera for eliminating fluctuation of film speed in the focal plane of a camera.

Figure 4:
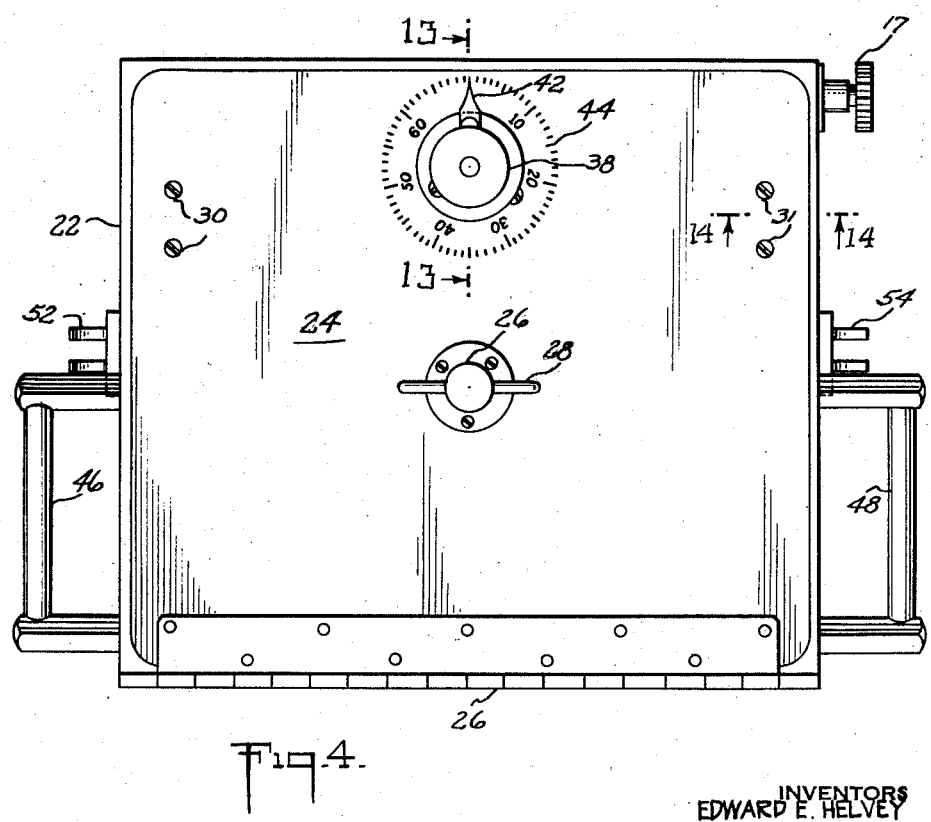
Figure 6:
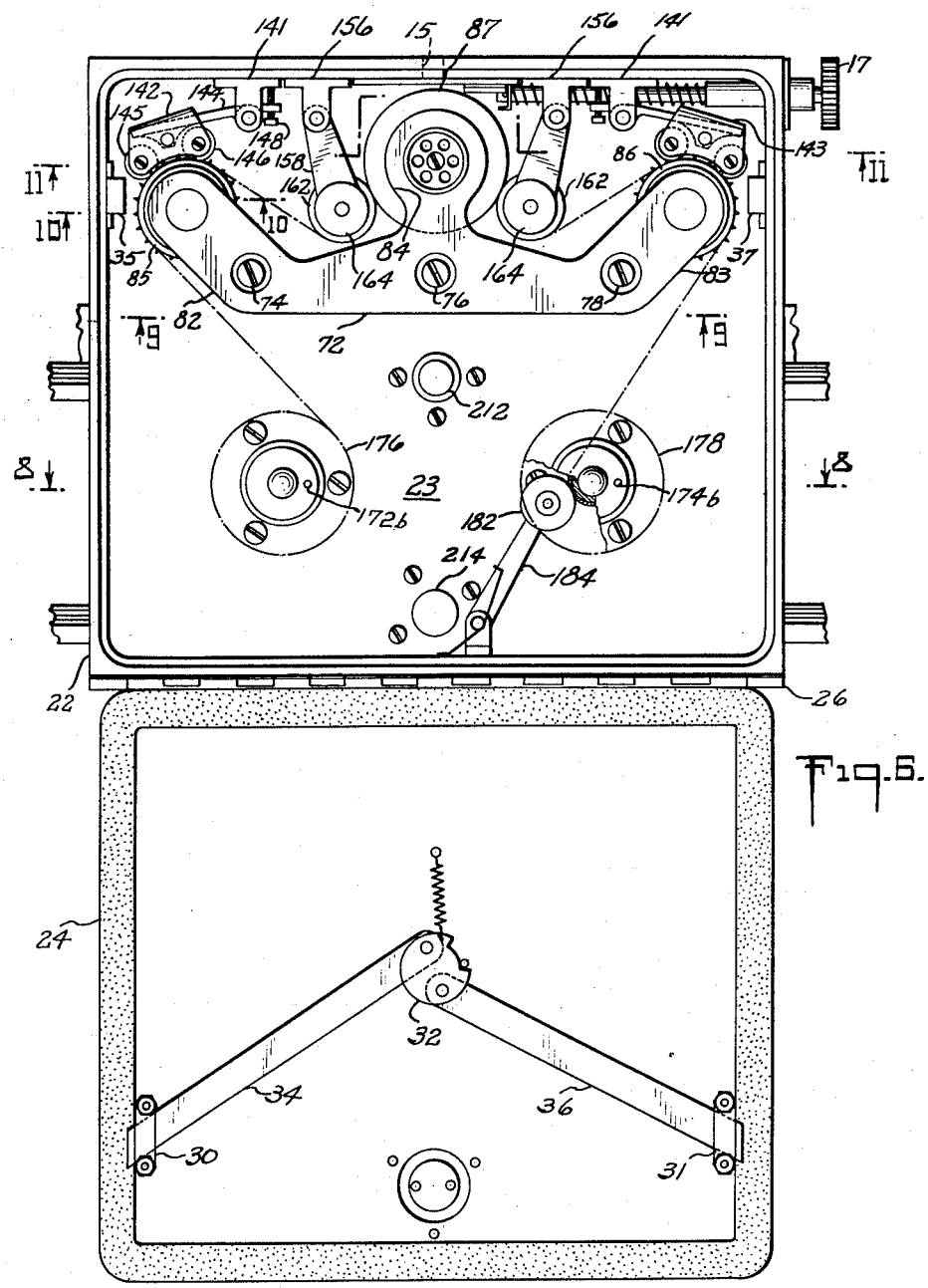
Figure 12:
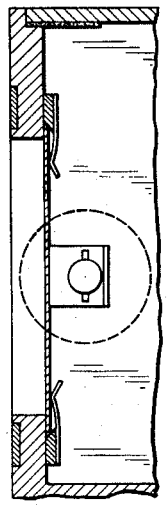
Figure 13:
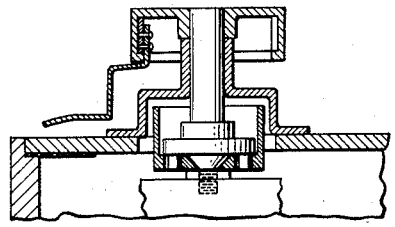
Figure 14:
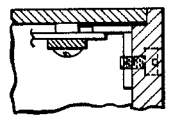

Other objects and many of the attendant advantages of this invention will be readily appreciated as the same becomes better understood by reference to the following detailed description when considered in connection with the accompanying drawings wherein:

Fig. 1 is a side plan view of an embodiment of this invention with the drive and lens supporting means shown in solid lines and the magazine shown in phantom, Fig. 2 is a top plan view of the drive and lens supporting means shown in Fig. 1, Fig. 3 is a bottom plan view of the drive and lens supporting means shown in Fig. 1 with a portion of the cover broken away, Figs. 4 and 5 are top and end plan views respectively of the magazine shown in phantom in Fig. 1, Fig. 6 is a top plan view of the magazine with its hinged door in open position and with the handles broken away in part, Fig. 7 is a bottom plan view of the magazine with its back cover plate removed and with its handles broken away in part, Fig. 8 is a section taken along the line 8—8 of Figs. 6 and 7, Figs. 9, 10, and 11 are sections taken along the lines 9—9, 10—10, and 11—11 respectively of Fig. 6; in Fig. 11, some parts are omitted for clarity, Fig. 12 is a section taken along the line 12—12 of Fig 11, Figs. 13 and 14 are sections taken along the lines 13—13 and 14—14 respectively of Fig. 4.

In Fig. 1 there is shown an assembled camera 10 according to this invention. The assembly comprises a motor and gear housing 12, a film magazine 14, and a lens and lens focus means 13. The film magazine 14 is more completely shown in Figs. 4, 5, 6 and 7.

The film magazine 14 includes a light-tight housing 22. The light-tight housing 22 is substantially rectangular and includes an integral partition wall 23 and a cover 24 (Fig. 6), secured by means of a piano hinge 26 to one edge of the housing 22.

The housing 22 is formed with a film exposure aperture 15 (Figs. 5 and 6). A shutter 16 is slidably mounted in the housing 22 and spring-biased to block the aperture 15 (Fig. 11). The shutter 16 is slidable out of aperture blocking position by means of manually operable knob 17. Bayonet pin 18 serves to retain the shutter in open position when the knob 17 is manually pulled outwardly and turned a fraction of a turn.

A latching means for the door includes a rotatable knob 26 (Fig. 4) including a diametrically disposed rod 28. The rotatable knob 26 is directly connected to a member 32 on the opposite side of the cover 24 (Fig. 6). A pair of locking bars 34 and 36 are pivotally connected to the member 32 eccentrically of the latter in a conventional manner whereby when the knob 26 is rotated the diagonally disposed bars 34 and 36 are caused to move in guides 30 and 31, respectively, to either latch or unlatch position. When the bars are in latch position they are adapted to engage lugs 35 and 37 on the housing 22. The cover 24 further supports a suitable indicator 38 (Fig. 4) for the purpose of indicating the number of feet of film which remain unexposed. The indicator 38 includes a pointer 42 adapted for cooperation with indicia 44 engraved on the face of the cover 24, adjacent to indicator 38 and circularly disposed thereabout. The indicator 38 is adapted to be set when the magazine is loaded with film and to be driven synchronously therewith. Magazine housing 22 includes a pair of oppositely disposed handles 46 and 48 to provide for ease in handling. Adjacent to handles 46 and 48, respectively, there are formed lugs 52 and 54 (Fig. 4). The lugs 52 and 54 are adapted for cooperation with magazine toggle clamps 56 and 58 (Figs. 1, 2, and 3) whereby the magazine may be detachably secured to the motor and gear housing 12. Each of the clamps includes a body member 62, pivotally secured to the housing 12. Reciprocatably mounted within the lug body 62 is a rod 64 loaded by a spring, not shown, whereby it is urged to its inmost position relative to the body 62. A forked member 66 is secured to one end of the rod 64 by means of a pivot connection 68. The spacing of the tines of the forked member 66 corresponds to the spacing of the portions of each of the lugs 52 and 54 formed on the motor and gear housing 12 whereby the ends of the tines of the fork 66 is adapted to engage the lugs 52 and 54 to thereby retain the magazine in assembled relationship with respect to the motor and gear housing 12.

Secured within the film magazine 14 is a bracket 72 (Fig. 6). The bracket 72 is secured parallel to and spaced from the integral partition 23 of the film magazine housing 22 by means of three screws, 74, 76 and 78, three spacers, 74a, 76a, and 78a and three screws 74b, 76b, and 78b. The bracket 72 includes three arms, 82, 83 and 84. Mounted between the end of each of the arms 82 and 83 and the integral partition 23 is a sprocket 85 and 86, respectively. In use, it is inevitable that there be some play between the sprocket teeth and the corresponding openings in the film. To overcome the fluctuations in speed and transient motion, a mechanical filter is incorporated into each of the sprockets.

The sprockets 85 and 86 are clearly illustrated in Figs. 6, 9, and 10. The sprocket shown in Fig. 10 is hereinafter referred to by reference character 85. It includes a cylindrical shell 91 which is coaxial with and free to rotate about a shaft 92. One end of the shaft 92 is mounted for rotation in a bearing 94 supported by the bracket arm 82 of bracket 72. The end of the bearing 94 is covered by a shield 96. The opposite end of the shaft 92 is mounted for rotation in a bearing 98, the latter being seated in the integral partition 23 of the magazine housing 22. The sprocket shell 91 includes two circular series of evenly spaced teeth 104. The inside diameter of the sprocket shell 91 is increased at each end as shown at 106 and 108. The shell 91 is internally threaded from each end approximately half the axial distance defined by the portions of increased inside diameters at 106 and 108. Seated against the shoulder defined by the portions of increased diameter at each end of the sprocket shell 91 is a disc-like bearing 112 and 114. Each of the disc-like bearings 112 and 114 are secured within the opposite ends of the sprocket shell 91 by means of locking rings 116 and 118 threaded into the sprocket shell 91 and in abutment with the disc-like bearings 106 and 108. Each of the disc-like bearings 106 and 108 is centrally formed with a bore 107 and 109 respectively. Suitable fluid seals 122 and 124 prevent the escape of fluid contained within the sprocket shell 91. Secured to the shaft 92, to rotate therewith, is a drum 126. The outside diameter of the drum 126 is slightly less than the inside diameter of the shell 91. The drum 126 is mechanically linked to the sprocket shell 91 by means of a torsion spring 128 coiled about the shaft 92 and with the opposite ends thereof engaging within the suitable openings formed in the disc-like bearing 112 and the drum 126, respectively. A thrust washer 132 is included between the drum and the opposite disc-like bearing 114. The entire space between the drum 126 and the sprocket shell 91 is filled with a viscous fluid such as a high viscosity very stable oil 135. Silicone oil is suitable for this purpose because of its excellent temperature stability and because it does not change to any appreciable extent with age. Secured to the shaft 92 adjacent to bearing 98 is a spur gear 134. The spur gear 134 is mounted on the shaft 92 and is included in the space between the rear cover 102 of the housing 22 and the integral partition 23. The sprockets 85 and 86 are linked to one another and to the film drum 84 by means of a gear train including the spur gears 134 on the shafts 92 of the sprockets 85 and 86, the idler gears 135 and the spur gear 136 secured to the end of the shaft 89 (Figs. 7 and 9) supporting the film drum 87. The principal effect which is overcome by this arrangement are speed fluctuations and transients caused by the dimensional inaccuracies of the holes punched in the film.

Associated with the sprockets 85 and 86 are guides 142 and 143 (Figs. 6 and 11), respectively. Each guide comprises arms 144 supporting a pair of spaced parallel shafts 144a and 144b that mount rollers 145 and 146. The guide assembly 142 is pivoted on bracket 141 and housing 22. One end of one arm 144 includes an adjustable stop in the form of a screw 148. The guide assembly 142 can assume either of two positions, in one of which the rollers 145 and 146 bear against the film to retain the film in proper relationship to the associated sprocket and in the other the rollers are spaced from the film and sprocket. The means for defining the two positions is a cantilever spring 149 (Fig. 11) having a perpendicular projection 150 at one end for engaging on either side of a corresponding tapered projection on member 151 movable with the guide assembly 142.

Mounted adjacent to brackets 141 are brackets 156. Two assemblies 151 each having arms 158, the ends of which supports a roller 162 are pivotally supported by brackets 156 and the housing 22. The rollers 162 are adapted to bear against the main drum 87 approximately 270° apart with respect to the axis of drum 87. Each of the rollers 162 is associated with a manually adjustable knob 164, fixed thereto. There is provided for the arms 158, position defining means including cantilever springs 149a and projections 150a as has been described for the guide assembly 142 to define two positions therefor.

Spaced from the bracket 72 is a pair of spaced spindles 172 and 174. Each of the spindles 172 and 174 is rotatably mounted on the partition 23. A pair of film reels 176 and 178 are adapted to be mounted on the spindles 172 and 174, respectively. The reels are removably retained on the spindles through the use of conventional spring-biased detent means, not shown, in the reels and engageable with grooves 172a and 174a on spindles 172 and 174 respectively. Pins 172b and 174b on spindles 172 and 174 respectively (Fig. 6) engage the reels so that they do not rotate relative to the spindles. The spindle 174 is adapted to be driven by a take-up motor, not shown. Frictional braking means 172c and 174c (Fig. 8) prevent the spindles 172 and 174 from running free. In operation (Fig. 6), film from the supply reel 176 is threaded over the sprocket 85 around the roller 162, main drum 87, around the other roller 162, over the sprocket 86 to the take-up reel 178. After the film is threaded the rollers are snapped into position against drum 87. A take-up tension roller 182 (Figs. 6 and 10) bears against the periphery of the take-up reel 178. The tension roller 182 is mounted on a pivoted arm 184 for cooperation with the take-up reel.

The take-up reel is adapted to be driven by an independent motor, not shown, of a type having a substantially constant output torque. Friction braking means 172 and 174c substantially balance the take-up force applied by the take-up motor, not shown, so that there is little or no net force from the take-up and feed mechanism on the main film drive system via the gears 134, 135, 136. The drive motor and gear box 12 (Figs. 1 and 2) includes a main drive shaft 202 and a take-up shaft 204.

The main drive shaft 202 is adapted to connect directly with the shaft, not shown, supporting the film drum 84. It is only necessary that it be provided with sufficient power to overcome frictional losses in the bearings and gears, the main drum and sprockets. The motor and gear housing 12 further include a pair of projecting centering pins 206 and 208. The centering pins 206 and 208 enter into corresponding openings formed in the housing 22 and indicated at 212 and 214 (Fig. 6).

In operation, the film is threaded as shown in Fig. 6, and tightened about drum 87 by means of knobs 164. A slack loop is provided in the film on each side of the main drum to isolate the main drum 87 from transitory speed changes impulses transmitted through the film. Though the sprockets positively engage the film, there tends to be introduced transitory film speed changes due to load changes and sprocket hole size variations in the film and any variations in the teeth sizes of the sprockets. The film loops between the sprockets 85 and 86 and drive drum 87 serve to prevent film velocity changes from being transmitted by the film to the film drum. In addition, the combination spring and fluid drive coupling which links the sprockets 85 and 86 to the drum 87 acts as a mechanical filter which averages out velocity changes at the film sprockets and effectively prevents them from loading the film drum and causing rapid velocity changes in the film moving past the recording position.

For cathode ray tube trace recording the camera 10 and the cathode ray tube, not shown, whose traces are to be recorded are disposed in a light-tight enclosure. The cathode ray tube and its deflection circuitry is operated so that the traces are intensity modulated and linear and successive traces are written over the same linear portion of the cathode ray tube screen. The vertical deflection circuitry for the tube, which causes the successive traces to be written over the same linear portion of the tube screen, is operated in such manner that the vertical displacement between the beginning and the end of a trace is a constant and is comparable to trace width. The camera 10 is positioned and focused so that the aperture 15 of the camera is transverse to vertical displacement of the trace and the trace is focused on the film through the aperture. The aperture remains open continuously. The film in the camera is driven at a rate corresponding to the vertical sweep rate of the traces so that successive traces recorded by the film are perpendicular to the length of the film and spaced apart a constant distance which is comparable to trace width. The camera is particularly suitable for continuously recording facsimile messages in the manner described above. It is to be noted that in facsimile a scanned line occupies about one second in time; the corresponding film feed rate in the camera is very slow. The camera aperture is closed when all the film is exposed, the magazine is removed, and a second magazine 14 loaded with fresh film is substituted therefor. The film in the first magazine is removed in a dark room and developed.

Obviously many modifications and variations of the present invention are possible in the light of the above teachings. It is therefore to be understood that within the scope of the appended claims the invention may be practiced otherwise than as specifically described.

We claim:

1. A slow speed camera adapted for cathode ray tube trace recording, said camera comprising a light-tight enclosure having a slit therethrough, a shutter slidably engageable with said enclosure inside thereof for movement across said slit, focusing means supported adjacent the slit outside of said enclosure, a film supply means rotatably mounted inside said enclosure, a film takeup means rotatably mounted inside said enclosure with a portion projecting through and adapted to be driven by a takeup motor, a first sprocket assembly rotatably mounted in said enclosure with its axis parallel to the slit and to one side of said slit, means mounted on said enclosure for retaining film in engagement with said first sprocket assembly, a rotatable film drum mounted in said enclosure with its axis parallel to the slit and immediately in front of the slit, a second sprocket assembly rotatably mounted in said enclosure with its axis parallel to the slit and to the other side of the slit, means for retaining film in engagement with said second sprocket assembly, gear means linking said sprocket assemblies and said film drum and adapted to be driven by a drive motor, and means mounted on the inside of said enclosure for pressing film against said drum for retaining film in engagement with most of the periphery of said drum.

2. A slow speed camera as defined in claim 1 wherein each of said sprocket assemblies comprises a shaft, a drum in the form of a right circular cylinder and formed with a coaxial bore, said shaft being secured within the bore of said drum, a sprocket shell in the form of a right circular cylinder with an inside diameter slightly greater than the outside diameter of said drum and having sprocket teeth, bearing means for mounting said sprocket shell on said shaft coaxially therewith and for permitting relative rotation between said shaft and said sprocket shell, a torsion spring coiled about said shaft between said drum and said bearing means and connected at one end to said drum and at its other end to said bearing means, a highly viscous fluid having good temperature stability and undergoing substantially no change with age filling the free volume included by said sprocket shell and said bearing means, and fluid sealing means mounted on said bearing means to prevent escape of said fluid whereby said sprocket assembly filters out mechanical transients.

3. A sprocket assembly comprising a shaft, a drum in the form of a right circular cylinder and formed with a coaxial bore, said shaft being secured within the bore of said drum, a sprocket shell in the form of a right circular cylinder with an inside diameter slightly greater than the outside diameter of said drum and having sprocket teeth, bearing means for mounting said sprocket shell on said shaft coaxially therewith and for permitting relative rotation between said shaft and said sprocket shell, a torsion spring coiled about said shaft between said drum and said bearing means and connected at one end to said drum and at its other end to said bearing means, a highly viscous fluid having good temperature stability and undergoing substantially no change with age filling the free volume included by said sprocket shell and said bearing means, and fluid sealing means mounted on said bearing means to prevent escape of said fluid whereby said sprocket assembly filters out mechanical transients.

4. A sprocket assembly for damping and filtering out speed variations in means driven thereby, said sprocket assembly comprising: a shaft; a sprocket shell; means for mounting said sprocket shell on said shaft whereby said shaft and said sprocket shell may rotate relative to one another; an inertia drum fixed to said shaft within said sprocket shell; and energy storing and damping means for filtering force applied between said shaft and said sprocket shell, said energy storing and damping means including a torsion spring coiled about said shaft between said mounting means and said drum and connected to said mounting means for said sprocket shell and to said drum, and highly viscous silicone oil filling the free space included by said sprocket shell and said mounting means for said sprocket shell.

5. Apparatus for connection to a substantially constant speed drive means for driving elongated roll strip material having sprocket holes, such as roll film, and for damping and filtering out variations in force between the drive means and the strip material during regular running conditions, whereby said apparatus substantially does not transmit momentary force impulses, said apparatus comprising: a shaft for coupling to the drive means; a sprocket shell open only at the ends and having sprocket teeth for registration with the holes of the roll strip material; means mounting said sprocket shell on said shaft coaxial with said shaft for rotation about their common axis relative to the shaft and hermetically sealing the open ends of said sprocket shell to said shaft; and mechanical force coupling and filtering means engaging said shaft and shell and including force transmitting fluid between said sprocket shell and said shaft for transmitting force between said shaft and said sprocket shell while minimizing momentary force impulses.

6. Apparatus as defined in claim 5 wherein said mechanical force coupling and filtering means also includes a torsion spring secured to said sprocket shell and said shaft.

7. Apparatus as defined in claim 6 wherein said mechanical force coupling and filtering means also includes in a cylindrical inertia member secured to one of said sprocket shells and said shaft.

References Cited in the file of this patent
UNITED STATES PATENTS

| | | |
|---|---|---|
| 1,152,989 | Taylor | Sept. 7, 1915 |
| 1,884,168 | Owens | Oct. 25, 1932 |
| 2,008,973 | Tuttle | July 23, 1935 |
| 2,685,417 | Bartelson | Aug. 3, 1954 |